United States Patent Office

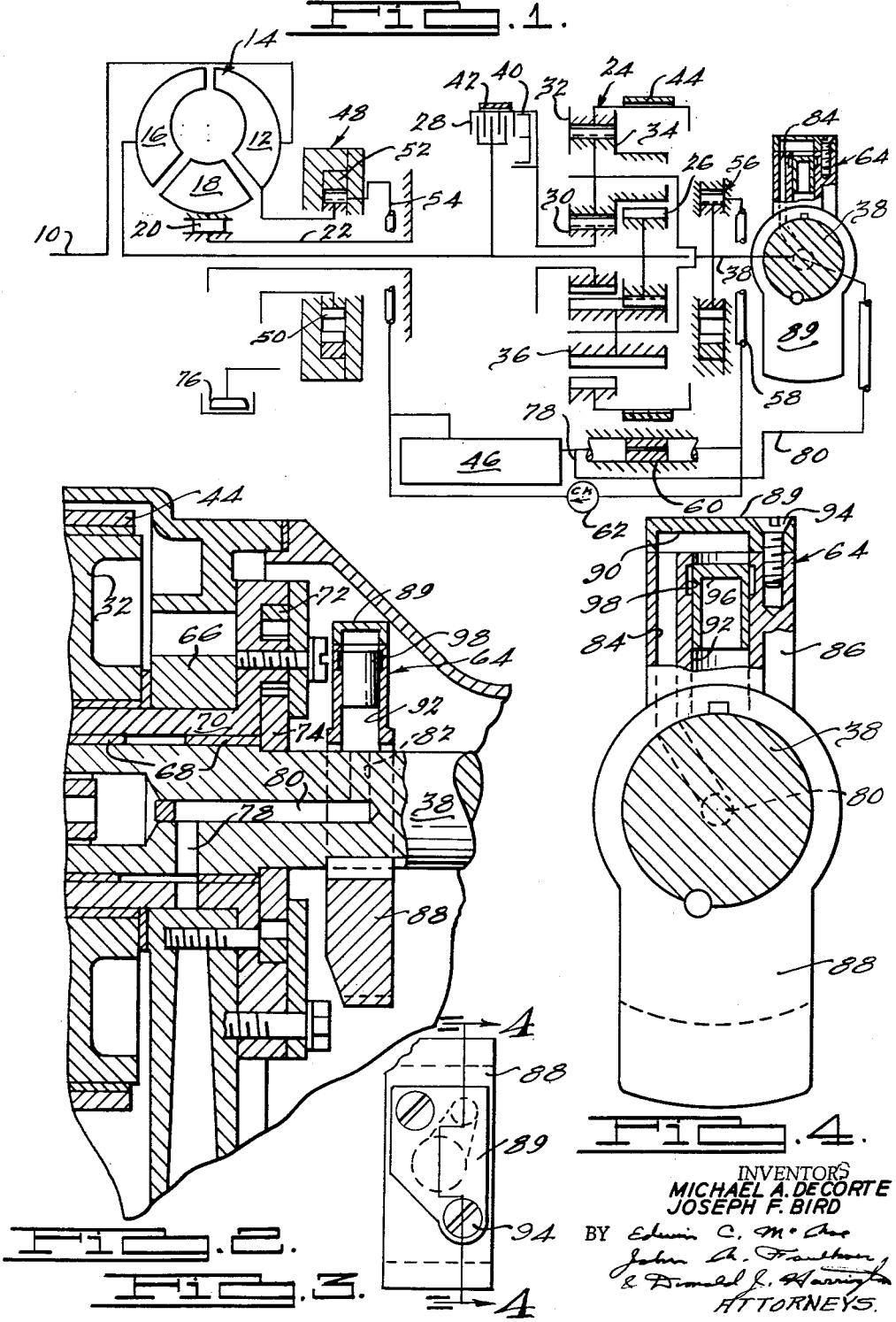

3,022,631
Patented Feb. 27, 1962

3,022,631
SINGLE ORIFICE FLUID PRESSURE GOVERNOR MECHANISM
Michael A. de Corte, Farmington, and Joseph F. Bird, Detroit, Mich., assignors to Ford Motor Company, Dearborn, Mich., a corporation of Delaware
Filed Sept. 13, 1957, Ser. No. 683,793
7 Claims. (Cl. 60—52)

Our invention relates generally to automatic control mechanisms and more particularly to an improved and simplified speed sensitive control means capable of being used with a fluid pressure control circuit for a system of fluid pressure operated servo elements.

The improvement of our instant invention is particularly adapted to be used with a fluid pressure control circuit for an automatic, multiple speed, power transmission of the automotive type and it is capable of establishing a vehicle speed sensitive pressure which may be utilized by various elements of the control circuit to initiate automatic shifts from one speed ratio to another.

We are aware of various governor mechanisms for automatic control circuits which are adapted to provide a speed sensitive pressure signal for control purposes, but they are of relatively complex construction and they require a complex system of fluid pressure passages and ports. One such governor mechanism which is used with an automatic vehicle power transmission mechanism of well-known construction comprises a ported governor casing drivably carried by the transmission tail shaft and a multiple land valve spool disposed within a cooperating valve chamber formed in the casing. A control pressure passage and a governor pressure passage are formed in the casing and they each communicate with a valve chamber at spaced locations. The valve spool is adapted to control the degree of communication between the control pressure passage and the governor pressure passage, the governor pressure establishing a fluid pressure force which balances the centrifugal force acting on the valve spool to produce a regulated, speed sensitive pressure. In addition, an exhaust port and an associated exhaust passage communicate with the valve chamber to provide an escape from the residual fluid not directly to communication with the control pressure passage.

By way of contrast with a conventional governor mechanism of the type above described, the improved governor mechanism of our instant invention employs a single fluid pressure orifice and it comprises a simplified, single land valve element slidably disposed in a radially extending valve chamber, the latter in turn being formed in a simplified housing structure. The multiple valve lands and the compound pressure passages associated with conventional governor mechanisms of this type have been eliminated and only a single pressure passage is used. These and other simplifications in the construction have been accomplished without any elimination of function or sacrifice in performance when compared to conventional governor mechanisms of the type above described. The governor valve element acts in cooperation with a tail shaft driven pump and the discharge pressure level of this pump is regulated by the governor mechanism to produce a pressure signal which is a given function of tail shaft speed. The regulated pump discharge pressure may be utilized in the control circuit in various ways as will subsequently become apparent.

The provision of an improved governor mechanism of the type above set forth being a principal object of our invention, it is a further object to provide a governor mechanism of simplified construction which may readily be adapted to be used in a variety of control circuits and in various transmission structures.

It is a further object of our invention to provide a governor mechanism which is comprised of components requiring a minimum of finish machining during manufacture.

It is a further object of our invention to provide a governor mechanism which is reliable in operation and which requires no external adjustment or maintenance.

It is a further object of our invention to provide a governor mechanism for an automatic power transmission which comprises a power output shaft driven pump and which includes means for adapting the pump for operation as a control pressure source or as a source of pressure for the speed regulated portions of the mechanism.

For the purpose of more particularly describing the features of our invention, reference will be made to the following drawings in which:

FIGURE 1 is a schematic representation of elements of a multiple speed automatic power transmission mechanism capable of being used in the power train of a wheeled vehicle;

FIGURE 2 is a partial cross sectional view of the transmission mechanism of FIGURE 1 showing the improved governor structure of our instant invention;

FIGURE 3 is an end view of the valve portion of the governor mechanism of our instant invention; and FIGURE 4 is a cross sectional view partly in elevation showing the internal construction of the valve portion of the governor mechanism of our instant invention and is taken along section line 4—4 of FIGURE 3.

Referring first to FIGURE 1, numeral 10 schematically represents the crankshaft for a vehicle engine and it is drivably coupled to a pump member 12 for a hydrokinetic torque converter unit generally shown at 14. The unit 14 further includes a turbine member 16 and a reactor 18, the latter being interposed between the radially inward inlet section of the pump 12 and the radially inward outlet section of the turbine 16. The reactor 18 is rotatably journaled on a one-way brake 20 which in turn is anchored to the transmission housing through a relatively stationary sleeve shaft 22.

The hydrokinetic torque converter unit 14 cooperates with a compound planetary gear unit 24 to provide two forward driving gear ratios and a reverse gear ratio. The turbine member 16 is drivably coupled to a first of two sun gears 26 for the planetary unit 24 and a multiple disc fluid operated clutch 28 is adapted to drivably couple the turbine member 16 to the second sun gear 30, said sun gears 26 and 30 having different diameters and being situated in side-by-side relationship as shown.

The planetary gear unit 24 further includes an annulus or ring gear 32 which in turn drivably meshes with a first of two sets of planetary gear elements 34, the latter also meshing with sun gear 30 as indicated. A second set of planetary gear elements is shown at 36 and they drivably mesh with sun gear 25 and with the above mentioned planetary gear elements 34. Each of the two sets of planetary gear elements are journaled on a common carrier member which in turn is positively connected to a power output or tail shaft 38.

A fluid pressure operated servo 40 is provided for energizing the multiple disc clutch 28 and a friction brake band 42 may be employed for anchoring the movable portions of the clutch servo 40 and the sun gear 30 when the multiple disc clutch 28 is de-energized. Similarly, a friction brake band 44 may be provided for anchoring ring gear 32 of the planetary gear unit 24 thereby adapting the same to function as a reaction member during power delivery.

Suitable controls may be provided for sequentially energizing the brake bands 42 and 44 and the clutch 28 to obtain either of two forward driving gear ratios or a reverse gear ratio. To obtain a low speed, high torque multiplication ratio, brake band 42 may be energized thereby anchoring sun gear 30. Power is then transmitted from the torque converter pump member 12 to the turbine member 16 and then to sun gear 26. The planetary gear elements 36 will thus be driven and they in turn will drive planetary gear elements 34, the direction of rotation of the gear elements 34 thus being in the same direction as that of the sun gear 26. Since the sun gear is anchored, the carrier will thus rotate around its geometric axis and tail shaft 38 is thus driven at a speed ratio which is dependent upon the gear geometry.

To obtain a second or high range driving gear ratio, the brake band 42 may be de-energized and the multiple disc clutch 28 may be energized thereby locking together the sun gears 26 and 30. The elements of the planetary gear unit 24 thus turn as a unit and a power from turbine 16 is transferred directly to the tail shaft 38 at a speed ratio of unity.

Reverse drive may be obtained by de-energizing clutch 28 and brake band 42 and by simultaneously energizing brake band 44. Since the ring gear 32 now functions as a reaction member rather than the sun gear 30, as in the case of the low speed operation, the carrier member will be driven in a reverse direction when power is applied to the sun gear 26 by the turbine member 16 of the torque converter unit 14.

We have schematically illustrated the controls for effecting the above described sequential operation of the clutch and brake elements of the transmission and have designated the same by numeral 46. An engine driven positive displacement pump 48 serves as a fluid pressure source for the controls 46 and it may include a driving gear member 50 positively keyed to the engine driven pump member 12 of the torque converter 14. The gear member 50 cooperates with an internal gear member 52 and each of the gear members 50 and 52 are disposed in a pump cavity defined by the transmission housing. A high pressure pump discharge passage is shown at 54, and it communicates with the controls 46 as illustrated. It will be understood that suitable pressure passages extend from the controls 46 to each of the servos associated with the brake 28 and the brake bands 42 and 44.

A second positive displacement pump is generally designated in FIGURE 1 by numeral 56 and is drivably connected to the tail shaft 38. The pump 56 is provided with a pump discharge pressure delivery passage 58 which also communicates with the controls 46. A precalibrated orifice 60 is formed in the passage 58 as illustrated for purposes which will subsequently become apparent. A one-way check valve 62 is situated between the passages 58 and 54 to permit the tail shaft driven pump 56 to supply the controls 46 with operating pressure under those conditions in which the pump 48 is inoperative, the check valve 62 permitting the transfer of fluid pressure from delivery passage 58 to the passage 54 and the controls but preventing transfer of fluid pressure in the reverse direction from passage 54 to the passage 58. A governor valve mechanism is designated in FIGURE 1 by numeral 64 and is drivably connected to tail shaft 38.

Referring next to FIGURES 2 and 4 the pump 56 and the governor valve mechanism 64 are shown in more particular detail. As best seen in FIGURE 2 the tail shaft 38 is rotatably journaled in an end wall 66 of the transmission housing, suitable bearings 68 being provided for this purpose. The end wall includes a stationary sleeve 70 which also defines a pump cavity for the pump 56, the latter including an internal gear 72 and a mating external and driving gear 74. The gears 72 and 74 are situated in eccentric relationship and the driving gear 74 is keyed or otherwise drivably connected to the tail shaft 38. Suitable porting, not shown, may be provided in the casing defining the pump chamber to provide communication between the low pressure intake side of the pump 56 and the transmission sump schematically illustrated in FIGURE 1 by numeral 76. The pump 56 is further provided with a high pressure port which communicates with a radial passage 78 and with a longitudinal passage 80 formed in the tail shaft 38. The passage 80 may communicate with another radial passage 82 which in turn communicates with a radially extending passage 84 formed in the governor valve mechanism 64. As best seen in FIGURE 1, passage 78 intersects passage 58 at a point downstream from the restriction 60.

The governor valve mechanism 64 comprises a casing and two diametrically opposed parts identified by numerals 86 and 88, the former providing a casing for the governor valve elements and the latter forming a counterweight to balance the dynamic forces produced during operation. The above mentioned passage 84 is formed in the housing 86 and it extends to a radially outward region as indicated. Cap 89 is secured to the housing 86 and it is recessed as shown at 90 to establish communication between passage 84 and a radial bore 92. The cap 89 may be secured in place by suitable screws 94. A valve plunger 96 is slidably disposed in the bore 92 and it is urged in a radially outward direction under the influence of centrifugal force when the transmission tail shaft 38 is rotated during operation. An exhaust port 98 may be formed transversely in the housing 86 and it communicates with the bore 92, the valve plunger 96 being adapated to block the exhaust port 98 when it assumes a radially outward position and to open the same when it assumes a radially inward position. It is thus apparent that the valve element 96 will control the degree of communication between passage 84 and the exhaust region of the control circuit. The valve element 96 and the radial opening in which it is positioned are preferably cylindrical in form although conceivably some other geometry could be employed.

During operation the tail shaft mounted governor valve mechanism 64 is rotated about the axis of the transmission and the tail shaft driven pump 56 establishes a delivery pressure which is transmitted through passages 78, 80 and 84 to the radially outward end of the bore 92. The delivery pressure of pump 56 thus establishes a radially inward fluid pressure force on the valve element 96 to oppose the oppositely directed centrifugal force acting on the same. As the tail shaft speed increases, the radially outward centrifugal force will increase accordingly and the effective size of the exhaust port 98 is reduced. This creates a pressure buildup on the discharge side of the pump 56 and this discharge pressure can thus be used as a speed signal for the controls 46.

It will be apparent from FIGURE 1 that the discharge of the pump 56 passes through orifice 60 during normal operation before it enters the region of the controls 46 and a pressure drop is thus established at this point. The magnitude of this pressure drop may be calibrated in order to obtain a desired operating governor pressure level. Further, the orifice 60 creates a sufficient back pressure to permit the pump 56 to supply the controls 46 with control pressure during those instances when the engine is stalled and the pump 48 is inoperative. This permits the vehicle operator to obtain a push start. The check valve 62 permits the transfer of fluid pressure from the pump 56 to the controls 46 as previously explained.

The pressure passage system and the porting for the governor structure of our instant invention are greatly simplified in comparison with the passages required for conventional fluid pressure governors. Also, the single orifice feature on the governor valve mechanisms permits the use of a centrifugal valve plunger in lieu of a conventional, complex valve spool of the type found in conventional fluid pressure governors.

What we claim and desire to secure by United States Letters Patent is:

1. A multiple speed power transmission mechanism for delivering power from a driving member to a driven member and including a fluid pressure control system adapted to regulate changes in the effective transmission torque multiplication ratio, a speed governor mechanism for producing a pressure signal which is a function of the speed of rotation of said driven member, a fluid pressure pump, a governor valve assembly drivably connected to said driven member, a fluid pressure delivery conduit communicating with the discharge side of said pump including a first portion extending to a fluid pressure actuated portion of said control system for effecting a change in the effective transmission torque multiplication ratio and a second portion extending to a part of said control system which is sensitive to said pressure signal, a flow restricting orifice in said second portion for creating sufficient back pressure in said first portion to permit said pump to effect a change in the effective torque multiplication ratio, said valve assembly including a rotatable valve casing, a single pressure passage in said casing extending in a generally radial direction and communicating with said second portion at a location downstream from said orifice, a valve opening in said casing situated in transverse disposition relative to the axis of rotation of said driven member, an exhaust port communicating with said valve opening and a valve element mounted in said valve opening and adapted to control the degree of communication between said pressure delivery passage and said exhaust port, said pressure delivery passage communicating with said valve opening at a location radially outward from said valve element, said valve element being subjected to and actuated by balanced and opposed fluid pressure and centrifugal forces.

2. A multiple speed power transmission mechanism for delivering power from a driving member to a driven member and including a fluid pressure control system adapted to regulate changes in the effective transmission torque multiplication ratio, a speed governor mechanism for measuring the speed of rotation of said driven member, a fluid pressure pump and a governor valve assembly independently and drivably connected to said driven member, a fluid pressure delivery conduit communicating with the discharge side of said pump including a first portion extending to a fluid pressure actuated portion of said control system for effecting a change in the effective transmission torque multiplication ratio and a second portion extending to a speed sensitive portion of said control system, a fluid flow restriction formed in said second conduit portion for creating sufficient back pressure in said first portion to permit said pump to effect a change in the effective torque multiplication ratio, said valve assembly including a rotatable valve casing, a valve opening in said casing situated in transverse disposition relative to the axis of said driven member, an exhaust port communicating with said valve opening at a radially outward location, and a valve element mounted in said valve opening and adapted to control the degree of communication between said pressure delivery passage and said exhaust port, said second conduit portion communicating with said valve opening at a location spaced radially outward from said valve element, said valve element being subjected to and actuated by balanced and opposed fluid pressure and centrifugal forces, the centrifugal force tending to adjust said valve element toward an exhaust port closing position and the pressure force tending to adjust said valve element toward an exhaust port opening position.

3. In a control system for a multiple speed power transmission mechanism adapted to deliver power from a driving member to a driven member; governor means sensitive to the driven speed of said driven member for creating a fluid pressure signal which is proportional in magnitude to said driven speed, said governor means including a fluid pressure pump and a governor valve assembly independently and drivably connected to said driven member, and a first pressure passage communicating with the discharge side of said pump including a first portion extending to said governor valve assembly and a second portion extending to other portions of said control system, a flow restricting orifice in said first passage portion, a second fluid pressure pump drivably connected to said driving member, a second pressure passage extending from the discharge side of said second pump to said other portions of said control system, a one-way check valve means interposed between said second portion of said first pressure passage and said second pressure passage for permitting tranfer of fluid pressure from the former to the latter when the discharge pressure for said first mentioned pump exceeds the discharge pressure of said second pump, a speed sensitive portion of said control system communicating with said first passage portion at a location downstream from said orifice, said valve assembly including a valve chamber transversely disposed relative to the axis of rotation of said driven member, an exhaust port communicating with said chamber at a radially outward location and a movable valve element adapted to move across said exhaust port and to control the degree of communication between said first passage portion and said exhaust port, said first passage portion communicating with said valve chamber at a location spaced radially outward from said valve element whereby a regulated fluid pressure in said passage acts on said valve element to establish a radially inward fluid pressure force to balance the centrifugal force established during operation.

4. The combination as set forth in claim 3 wherein said valve assembly comprises a radially disposed circular bore, said exhaust port communicating with said bore at a first radial station and said first pressure passage portion communicating with said bore at a station situated radially outward of said first station.

5. The combination as set forth in claim 4 wherein said valve element is comprised of a cylindrical valve plunger of uniform external dimensions.

6. In a multiple speed power transmission mechanism for delivering power from a driving member to a driven member and including a fluid pressure control system adapted to regulate changes in the effective transmission torque multiplication ratio; governor means sensitive to the driven speed of said driven member for obtaining a fluid pressure signal which is proportional in magnitude to said driven speed, said governor means including a fluid pressure pump and a governor valve assembly independently and drivably connected to said driven member, a pump discharge pressure passage including a first portion extending from the discharge side of said pump to pressure sensitive regions of said control system for effecting a change in the effective transmission torque multiplication ratio and a second portion intersecting said first portion and extending to said governor valve assembly, a precalibrated fluid flow restriction located in said second passage portion on the downstream side of the intersection between said first and second passage portions for creating sufficient back pressure in said first portion to permit said pump to effect a change in the effective torque multiplication ratio, said valve assembly including a valve chamber transversely disposed relative to the axis of rotation of said driven member, an exhaust port communicating with said valve chamber at a radially outward location and a movable valve element in said valve chamber adapted to move across said exhaust port and to control the degree of communication between said second passage portion and said exhaust port, said second passage portion communicating with said valve chamber at a location spaced radially outward from said valve element whereby a regulated fluid pressure is established in said second passage portion which acts on said valve element to produce a radially inward pressure force to balance the centrifugal pressure force established during operation, the driven speed sensitive portion of said control system communicating with said second passage portion on the downstream side of said orifice whereby said regulated fluid pressure is utilized as a speed signal.

7. In a control system for a multiple speed power transmission mechanism adapted to deliver power from a driving member to a driven member; governor means sensitive to the driven speed of said driven member for obtaining a fluid pressure signal which is proportional in magnitude to said driven speed, said governor means including a fluid pressure pump and a governor valve assembly independently and drivably connected to said driven member, a pump discharge pressure passage including a first portion extending from the discharge side of said pump to pressure sensitive regions of said control system and a second portion intersecting said first portion and extending to said governor valve assembly, a precalibrated fluid flow restriction located in said second passage portion on the downstream side of the intersection between said first and second passage portions, said valve assembly including a valve chamber transversely disposed relative to the axis of rotation of said driven member, an exhaust port communicating with said valve chamber at a radially outward location and a movable valve element in said valve chamber adapted to move across said exhaust port and to control the degree of communication between said second passage portion and said exhaust port, said second passage portion communicating with said valve chamber at a location spaced radially outward from said valve element whereby a regulated fluid pressure is established in said second passage portion which acts on said valve element to produce a radially inward pressure force to balance the centrifugal pressure force established during operation, the driven speed sensitive portion of said control system communicating with said second passage portion on the downstream side of said orifice whereby said regulated fluid pressure is utilized as a speed signal, another fluid pump drivably connected to said driving member, a second pressure passage extending from the discharge side of said other pump to said pressure sensitive region of the control system, and a one-way check valve means interposed between the first portion of said first pressure passage and said second pressure passage for permitting transfer of fluid pressure from the former to the latter when the discharge pressure for said other pump exceeds the discharge pressure for said first mentioned pump.

References Cited in the file of this patent

UNITED STATES PATENTS

| | | |
|---|---|---|
| 1,440,224 | Kasley | Dec. 26, 1922 |
| 1,791,028 | Huff | Feb. 3, 1931 |
| 1,980,926 | Moller et al. | Nov. 13, 1934 |
| 2,155,247 | Warner | Apr. 18, 1939 |
| 2,256,963 | Schmidt | Sept. 23, 1941 |
| 2,697,363 | Sheppard | Dec. 21, 1954 |

FOREIGN PATENTS

| | | |
|---|---|---|
| 83,117 | Austria | Mar. 10, 1921 |
| 550,239 | Great Britain | Dec. 30, 1942 |
| 734,009 | Great Britain | July 20, 1955 |
| 476,302 | Italy | Dec. 6, 1952 |
| 269,608 | Switzerland | Oct. 16, 1950 |